UNITED STATES PATENT OFFICE.

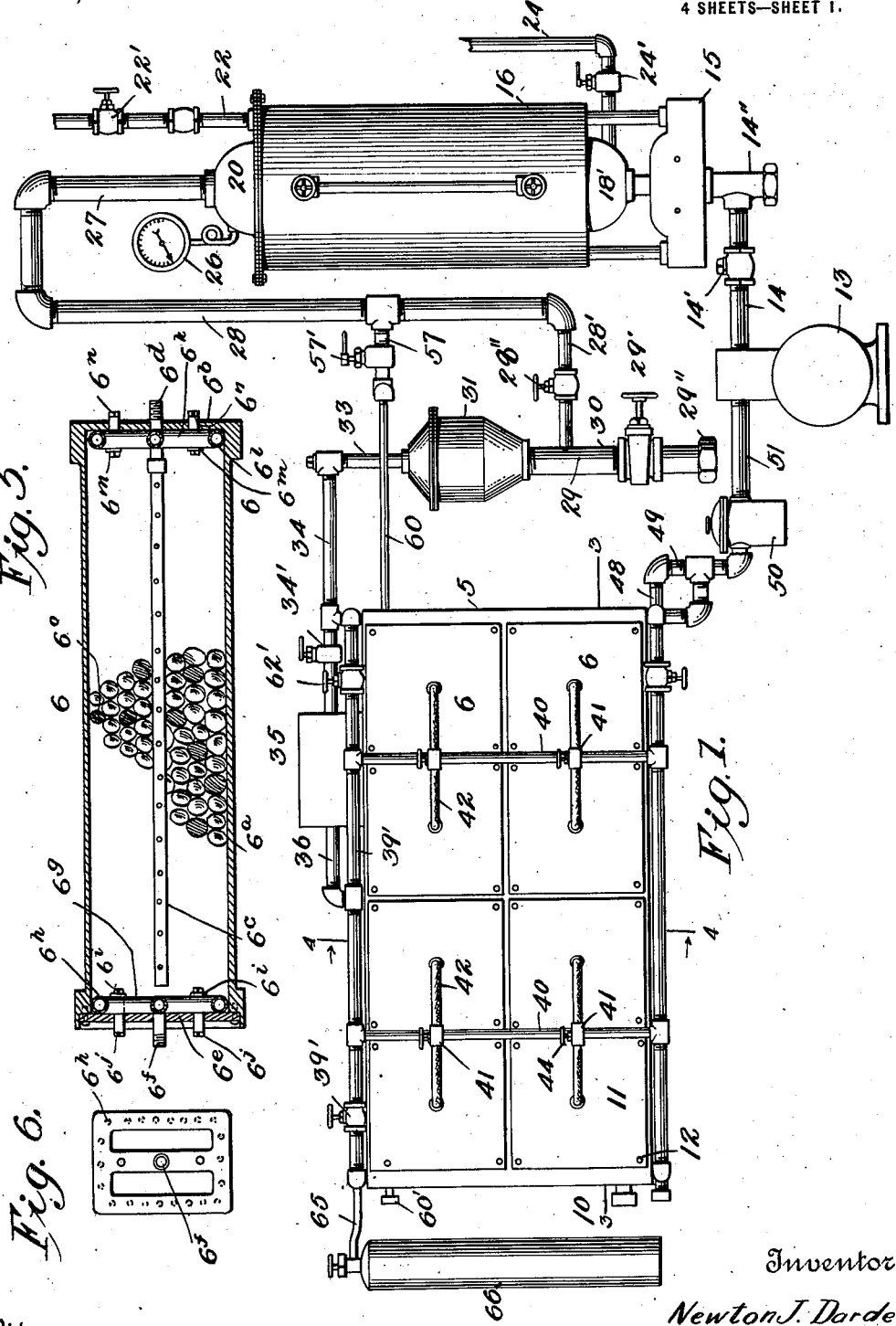

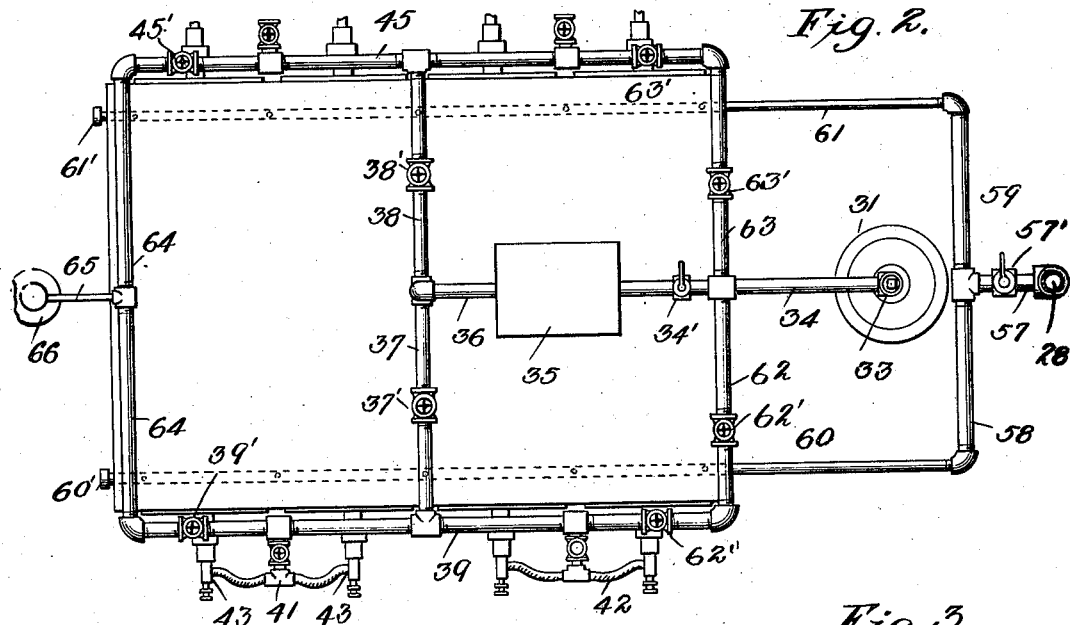
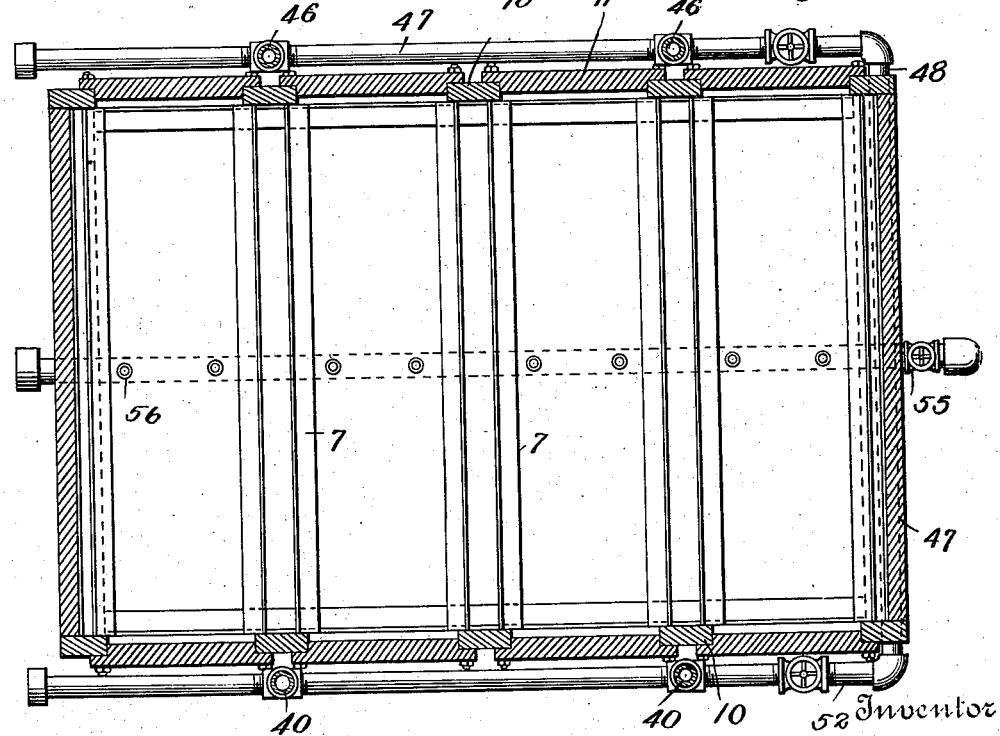

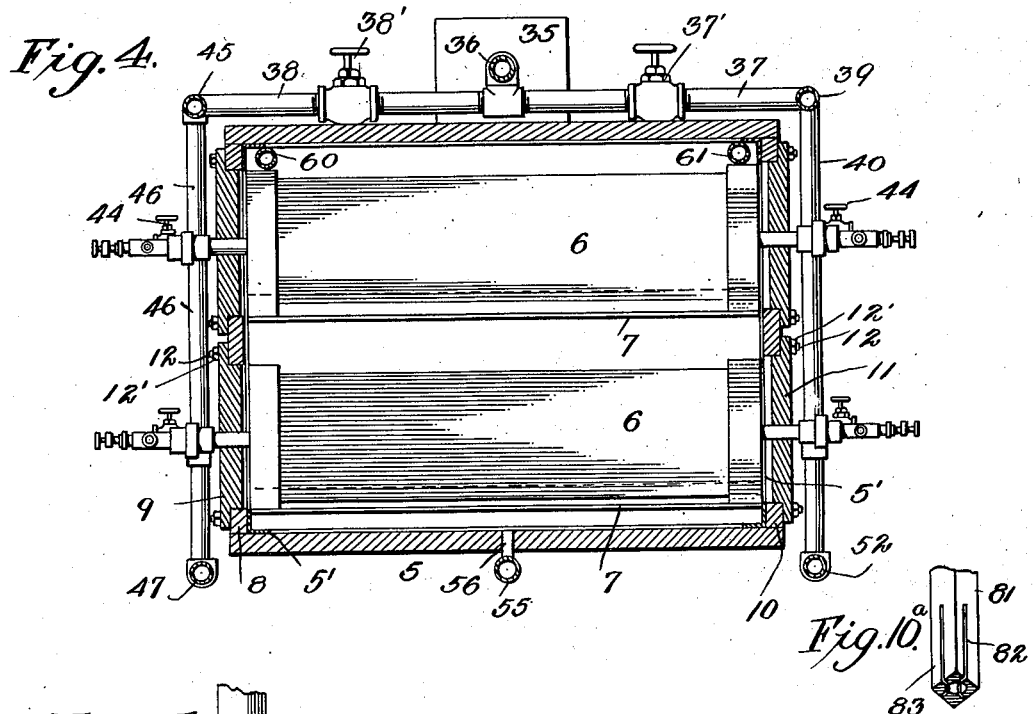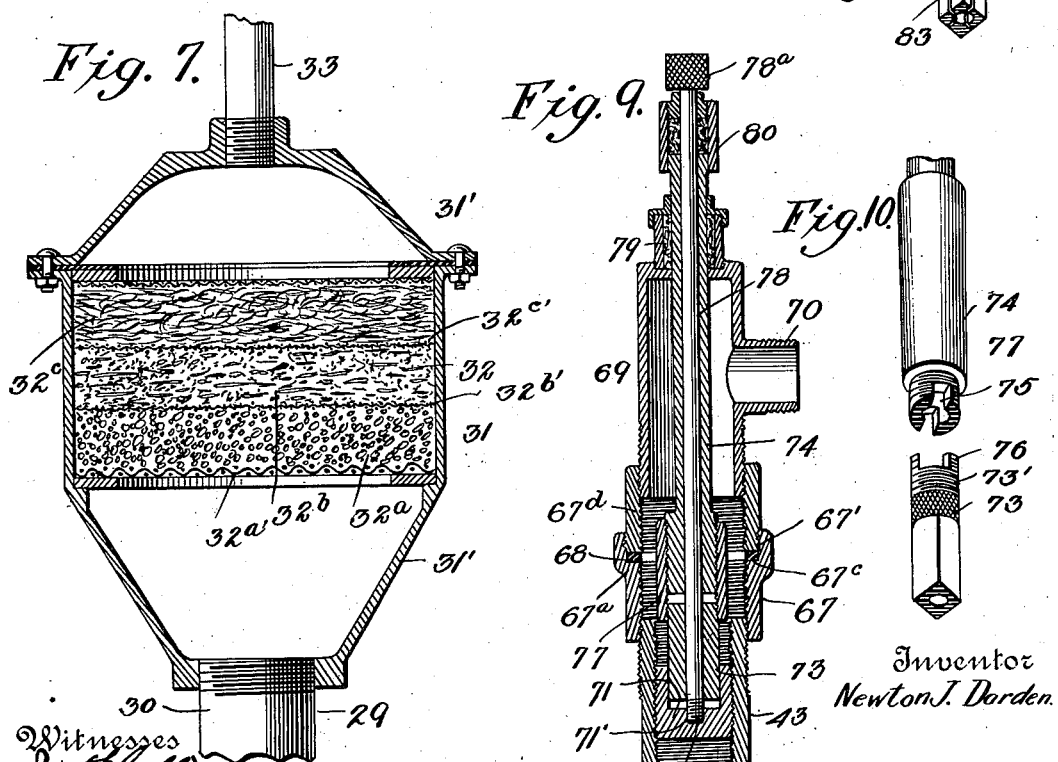

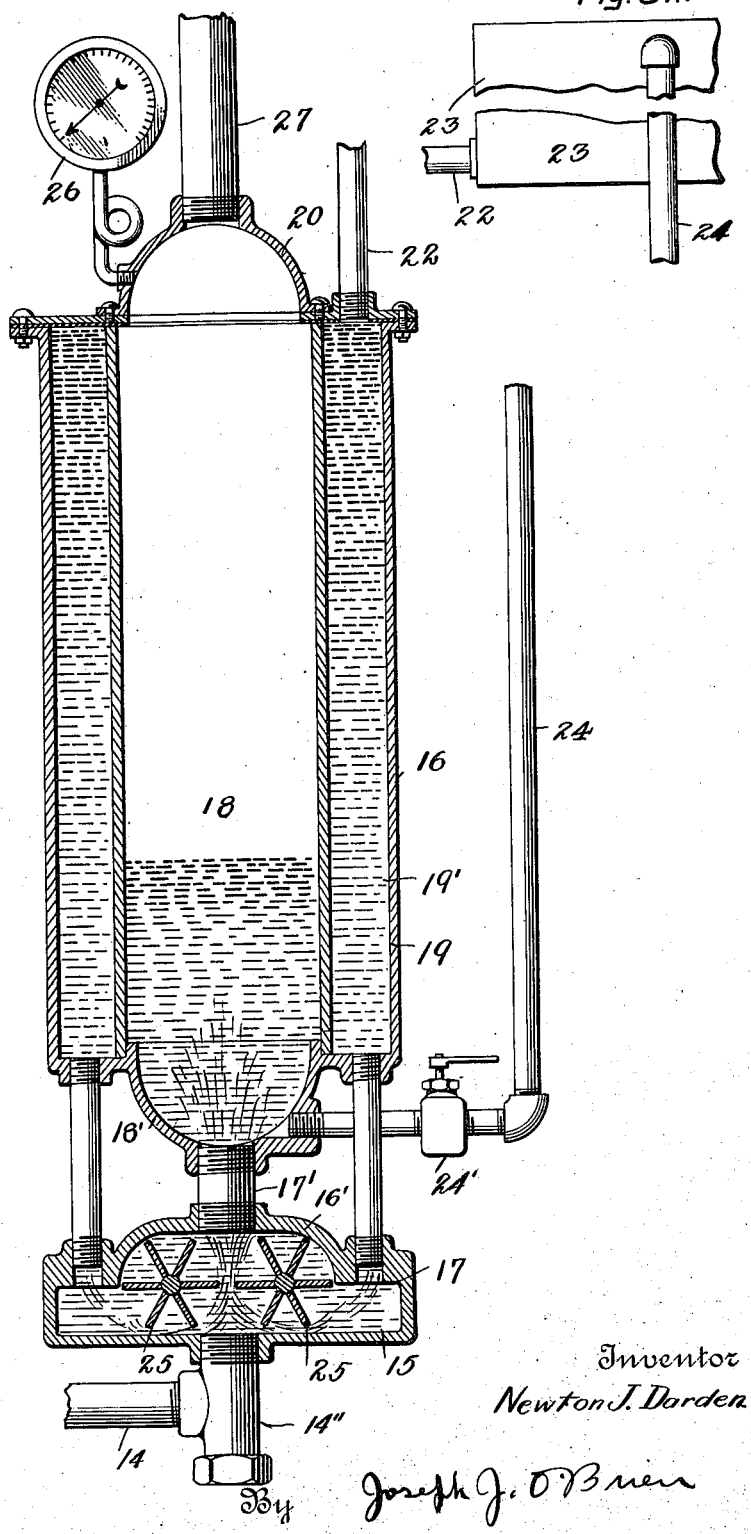

NEWTON J. DARDEN, OF MEMPHIS, TENNESSEE.

ART OF PRESERVING.

1,215,254.　　　　　Specification of Letters Patent.　　Patented Feb. 6, 1917.

Application filed October 15, 1912. Serial No. 725,872.

*To all whom it may concern:*

Be it known that I, NEWTON J. DARDEN, a citizen of the United States, residing at Memphis, in the county of Shelby and State of Tennessee, have invented certain new and useful Improvements in the Art of Preserving, of which the following is a specification.

This invention relates to the art of preserving organic substances or materials, such as fruits, vegetables, meats and other like products, and particularly to an improved process for reducing the products or materials to be preserved to a safe preserving temperature, controlling this temperature, and subjecting the materials or products to the washing action of an aseptic gas or fluid.

The leading object of the invention is to provide a preserving process which will be complete in its steps, and which will operate to control the temperature of the products or materials to be preserved and to cleanse said products or materials of all gases and germs by the washing action of uniformly directed currents of air.

Another object of the invention is to provide a process for cooling the products or materials to be preserved without injuring the tasting qualities of said products or materials.

A still further object of the invention is to provide a complete preservation process which embraces steps for gradually and thoroughly cooling the materials or products to be preserved, and steps for thoroughly sterilizing said materials or products, with the aid of ozonized, aseptic, dehydrated air, controlled from a pressure source controlling the cooling influence.

A still further object of the invention is to provide a process for preserving organic products or materials, including steps of inclosing the organic products or materials in hermetically sealed containers in which absorbing means for taking up the released gases are intermingled with the material or products, washing the organic products or material with a cold, dry, aseptic and ozonized air so as to sterilize and thoroughly cool the inclosed mass, expanding a cooling gas around the containers simultaneously with the washing of their contents, and surrounding the materials or products while inclosed with an inert gas, such as nitrogen, so as to preserve the effects of the washing and sterilizing process.

The invention further embraces certain combinations, constructions, and arrangements of parts and certain steps carried out therewith, fully described in the following specification and fully illustrated in the accompanying drawings, in which:—

Figure 1 is a side elevation of the apparatus employed in carrying out the preserving process.

Fig. 2 is a top plan view of the cooling cabinet.

Fig. 3 is a horizontal sectional view, taken on line 3—3 of Fig. 1.

Fig. 4 is a vertical sectional view thereof.

Fig. 5 is a longitudinal sectional view through one of the preserving cells or containers.

Fig. 6 is an end view thereof.

Fig. 7 is a vertical sectional view of the filter.

Fig. 8 is a vertical sectional view of the air washer, cooler and mixer.

Fig. 8$^A$ is a side elevation, of a water tank, shown broken away for convenience.

Fig. 9 is a longitudinal sectional view of a sealing coupling and operating device therefor.

Fig. 10 is a detail perspective view showing the bit of the device.

Fig. 10$^a$ is a detail perspective view of a modified bit.

In carrying out my invention or improved process the organic products or material to be preserved, such as fruits, vegetables, meats or other eatables, are arranged in hermetically sealed containers or cells, and these containers or cells subjected to the cooling influence of a compressed gas expanded exteriorly thereon, while the inclosed products or materials are subjected to the washing action of dehydrated, cold, aseptic, and preferably ozonized currents of air, while the products or materials are intermixed with absorbent means or balls for taking up the gases released by the enzemic action of the cells thereof. By these steps, efficiently carried out by the improved apparatus shown in the accompanying drawings, sterilization and cooling are simultaneously effected.

Experience in handling fruit has shown that the temperature of the fruit should be reduced to a preserving temperature as soon as possible after picking, and within twenty four hours, to attain the best results in preservation. This reduction of temperature should be uniform throughout the mass of fruit or material to be preserved, and all free germs and gases should be eliminated by sterilization and washing.

In the ripening process of fruit, and in meats during the period immediately following killing, an enzemic action takes place, during which period gases are generated, and during decomposition or decay other gases are generated. These gases, enzemic and decompositional, are negative factors in preservation, and their influence must be reduced to a minimum to attain efficient preservation with the most wholesome results.

The germs of the atmosphere tend to contaminate fruits, vegetables, meats and other organic products, and limit the period in which such organic products can be satisfactorily preserved. It is, therefore, vital that such germs should be eliminated from contact with the products to be preserved, as far as possible.

The presence of moisture in the atmosphere also tends to minimize the period during which the organic products can be satisfactorily preserved and it is likewise vital that the atmosphere of the organic products being preserved be as dry as possible. In the present icing systems this is impossible.

The accompanying drawings illustrate an apparatus for efficiently carrying out the process, which is adapted to cold storaging or extensive preservation, but which may be modified for household application upon a more modest scale.

In these drawings 5 denotes the cooling cabinet, the walls of which are formed of suitable heat insulated material, and this cabinet is provided with a plurality of inlets for the removable containers or cells 6. The frame work of this cabinet is composed of angle iron supports and beams 5', suitably united, and providing horizontal shelf supports 7, on which the containers or cells 6 normally rest. The rear wall 8 is provided with doors 9, suitably bolted in position, and the front wall 10 is provided with suitable doors 11, held in place by bolts 12, the inner ends of which are preferably embedded in the cabinet structure, the other ends projecting through said doors 11 and being engaged by the door holding nuts 12'.

The cells or containers 6 are so constructed as to be adapted for use either for storage or transport of food stuffs, or for use first in storing the food stuffs and then in transporting the food stuffs to the market, and holding the same in their protected atmosphere during the period awaiting sale and consumption.

As a cooling means I employ compressed air, which may be derived from any supply, such as a compressor 13. The air is directed from this supply source by means of a pipe 14, on which a check valve 14' is arranged. The pipe 14 connects with a vertical feed pipe 14'', which communicates with the bottom air intake and mixing chamber 15, of the tank 16, which is adapted to hold air and water under pressure.

The mixing chamber 15 has a top wall 17, through which a pipe 17' extends to form communication with the air chamber 18, through its bottom wall 18'. This chamber or tank is surrounded by a water jacketing tank 19, providing a space 19' for water.

A dome or cap piece 20 fits on the tanks 16 and 18, covering the water space 19' and the chamber 18. A pipe 22 having communication with the water space 19' extends through the dome to an elevated water supply tank 23, and a pipe 24 has communication with said tank 23 and the air chamber 18, through the bottom 18' of said chamber.

The top wall 17 of the mixing chamber 15 is formed with curved portions 16', and in this chamber, on opposite sides of the axis of the pipe feed 14'', two freely rotatable wheels 25 are arranged upon shafts journaled in the wall of said chamber 15. Each wheel has radial blades, the ends of which are adapted to closely fit the overhead curved portion 16'. The water space 19' is normally filled with water from the gravity pressure supply tank 23. The tips of the blades of the wheels 25 are slightly spaced from the bottom of the chamber 15 to provide water passages.

The compressed air flowing into the chamber 18 through the inlet pipe 17' creates a suction and exerts a stream force upon the blades or the wheels facing inwardly, thus rotating said wheels, and the spaces between the wheel blades form pockets for the water, so that uniform quantities of water are fed to the air stream and a too rapid water feed is prevented. The action of the inflowing air upon the rotating water wheels tends to evaporate the films of water adhering to said blades and to agitate the water, thus intimately mixing the inflowing air with the water, and consequently promoting the efficient washing of the air by the water.

A pressure gage 26 is provided on the dome 20 for indicating the pressure of the air in the tank 18. The water tank has a suitable water gage for indicating the height of the water.

A supply pipe 27 receives air from the chamber 18, through the dome 20, and has a portion 28, shown depending from the dome 20, which supplies air to the refrigerator cabinet and its cells. The pipe 28 is shown to be connected at its lower end to the filter pipe 29 by the branch 28', which carries the cut off valve 29', and said valve is spaced considerably below the pipes 29 and 28' to form a trap 30 in said pipe 29. The pipe 28' is equipped with a valve 28''. A closure cap 29'' is threaded on said pipe 29. The upper end of the pipe 29 is connected to a filter casing 31, which has conical end portions 31', provided to compensate for the increased resistance to the flow of air through the filter due to the obstruction of the filter elements. The filter casing 31 contains a filter 32, shown in section in Fig. 7, and this filter comprises an element 32$^a$, for dehydrating or drying the saturating air, which consists of unslaked lime; an element 32$^b$, for absorbing gases, consisting of charcoal in its most suitable form; and an element 32$^c$, for filtering germs, consisting of cotton, in its most suitable condition. The lime or dehydrating element 32$^a$ is arranged on a screen 32$^{a\prime}$, over the trap 30, the charcoal or gas eliminating element 32$^b$ is arranged on a screen 32$^{b\prime}$, over the lime or dehydrator; and the germ filter or cotton is arranged on a screen 32$^{c\prime}$, over the charcoal 32$^b$. The three elements are united to form a cartridge easily insertible and removable.

The arrangement of the filter elements is designed for a definite purpose. The air coming through the water becomes more or less saturated and the elimination of the moisture therefrom is very important. By placing the lime or dehydrator lowermost the saturated air passes through the lime first, thus giving up its moisture. The elimination of the moisture by the lime results in a certain amount of slaking, during which process water vapor or steam is released. The upwardly flowing air stream carries a part of this water vapor or steam with it, while a part is caught by the trap 30. The charcoal being immediately above the lime arrests the further flow of the gas and prevents the clogging of the germ filter, which is positioned above it. The air after passing through the dehydrator and the gas eliminator is still charged with germs, which are collected by the fibers of the cotton. As the air enters the filter pipe 29 it strikes against the wall of said pipe opposite the inlet and the heavy particles carried by it are precipitated into the trap, while the lighter particles are arrested by the action of the dehydrator screen 32$^{a\prime}$.

The filter casing 31 has an outlet 33, smaller in size than the pipe 29, and which communicates with the pipe 34, which pipe 34 leads to the ozonizer 35, which may be of any type and which is positioned on the cabinet 5. This ozonizer may be equipped to charge the air with as much as five per cent. of ozone. The ozonizer outlets by a pipe 36 to lateral pipes 37 and 38, which have cut off valves 37' and 38', respectively.

The pipe 37 communicates with the horizontal pipe 39, which supplies the front vertical distributers 40, which are provided with Y's 41, from which the flexible tubes 42 lead to the inlet nipples 43 of the containers or cells 6.

Each container or cell 6 comprises a tank 6$^a$, which has an end wall 6$^b$, through which the perforated air tube 6$^c$ is extended, the outer end of which projects from the end wall 6$^b$ to provide a nipple 6$^d$. The free end of the tube 6$^c$ terminates closely to the cover 6$^e$, which is held in hermetical sealing position by suitable means. Through this cover 6$^e$ a short tube 6$^f$ projects, forming the nipple 43. The inner end of said nipple tube 6$^f$ communicates with the end pipe 6$^g$, which has a plurality of open portions 6$^h$. Cut off valves 6$^i$ are located on said end pipe, and are operated by means of stems 6$^j$, which project through the cover 6. The end wall 6$^b$ is provided with an internal end pipe 6$^k$, having a plurality of open portions 6$^l$, located near the wall of the container or cell, and said end pipe 6$^l$ is provided with cut off valves 6$^m$, operated through stems 6$^n$, which project through the end wall.

The air is initially distributed through the container or cell by means of the pipe 6$^c$, which is perforated throughout its length, so that there will be an efficient lateral distribution, and the exhaust is through the end tube or pipe 6$^g$. After the current of washing air has been directed through the organic products or materials contained in the container or cell, the air is washed of the gases of decomposition and the waste matter taken up during its passage over and through the organic materials, and is dehydrated, and sterilized and returned to the apparatus to be reused in the cleansing and preservation of the organic materials to be preserved.

The container or cell 6 is designed for extensive preserving and is made to withstand wear. It is provided with an absorbent 6$^o$, in the form of charcoal balls or blocks, shaped to correspond with the shape of the fruit or to conform to the shape of other organic products packed in the container. The amount of charcoal balls used will depend upon the amount of gases generated during the period in which the organic products are inclosed in the container or cell. Sufficient charcoal balls are provided to absorb all the gases generated.

Cut off valves 44 are provided on the connection between the flexible tubes and the distributers 40. The pipe 38 connects with the rear horizontal pipe 45, which is connected with the vertical distributers 46, the lower ends of which are connected with the lower horizontal exhaust pipe 47. This pipe 47 connects, at its forward end, with the pipe 48, which is connected with the trap inlet 49, which leads to the trap 50, from which a pipe 51 leads back to the compressor 13. The front distributing pipes 40 are connected at their lower ends with the pipe 52 which connects with the trap 50. A pipe 55 is located centrally beneath the cabinet 5 and has communication through its converging floor by means of inlets 56 with the cabinet chamber, and is connected to the trap 50.

Cooling fluid or air under compression is supplied to the cabinet chamber by means of a pipe 57, which has communication with the pipe 28, and said pipe 28 has communication with pipes 58 and 59, which extend forwardly and rearwardly and which have communication with the distributing pipes 60 and 61, which are inclosed by the cabinet 5 and are perforated to spray air against the containers or cells 6 and in the cabinet chamber. The expansion of this air exerts a cooling influence upon the contents of the cells. The ends of the pipes 60 and 61 project through the cabinet 5 and are capped by closures 60' and 61'.

The upper side pipes 39 and 45 are connected at their forward ends to pipes 62 and 63, and these pipes 62 and 63 connect with the inlet feed pipe 34. The flow of air between the pipes 62 and 63 and 39 and 45 is controlled by means of valves 62' and 63'. At their rear ends the pipes 39 and 45 connect with each other, by means of a pipe 64, which can be supplied with an inert gas, such as nitrogen, carbon dioxid, or other like gas, by means of a feed pipe 65 and a supply tank 66. A valve 39' is located on the pipe 39 and a valve 45' is located on the pipe 45 for controlling the flow of the air. The pipe 34 is provided with a pressure valve 34'. The pipe 57 has a pressure valve 57', and the pipe 24 has a pressure valve 24'. A cut off valve 22' is located on the pipe 22.

The above described piping system is designed for the purpose of enabling the operator or engineer to instantly reverse the direction of flow of the air through the cells and through the cooling cabinet. By operating the proper valves the ozonizer can be cut in or cut out and the charge delivered from the ozonizer to the piping system regulated.

In order to secure a positive seal of the cells a special coupling, shown in Figs. 9, 10 and 10ª, and means for operating the same, is employed. This coupling consists of a sleeve 67 having a section 67ª enlarged to provide an internal seat 67ᶜ, and provided with internal screw threads 67' to engage the external screw threads on the sleeve section 67ᵈ. A gasket 68 is seated against the seat 67ᶜ and the inner end of the section 67ᵈ is threaded in the enlarged end of the section 67ª and is adapted to compress said gasket, which is slightly wider than its seat. The section 67ª is threaded on the nipple 43 and the section 67ᵈ is threaded on the T-coupling 69, which has a lateral branch 70. The internal threads of the sections 67ª and 67ᵈ are right and left, so that the nipple and the T 69 will be drawn toward the gasket as the sleeve 67 is turned and at the same rate of speed, or moved apart as desired.

When it is desired to disconnect the cell from the supply flexible tube an internal nut 71 is moved into the nipple 43 by means of a nut holding wrench consisting of a bit 73 and a handle 74. The bit 73 has a working end shaped to fit the nut with which it is to be engaged and has a longitudinal bore therethrough. The inner end of the bit 73 has threads 73' and end projections 76 spaced apart to fit in the recesses 75 of the forward end of the handle tube 74. A sleeve 77 is threaded on the tubular handle 74 and is adapted to straddle the joint between the bit and said handle and to engage the external screw threads on said bit, so as to hold the bit positively to the handle.

The internal sealing nut 71 is formed with a central screw threaded socket 71' which is adapted to receive the threaded end 78' of the nut holding rod 78, which slides through the bit 73 and the tubular handle 74. The tubular handle 74 is extended through a packing box 79, connected to the T-coupling 69, and the rod 78 is provided with a handle 78ª on its upper end and extends through the packing box 80.

By turning the nut holding rod 78 the nut 71 may be secured to the end of the wrench bit 73 and the nut threaded in the nipple 43 or frictionally held in the upper end of the T-coupling in inoperative position 69.

Fig. 10ª shows a slightly modified form of bit consisting of a bit 81 having slots 82 forming spring fingers 83 which are adapted to expand to engage the under cut or straight wall of the nut socket. These spring fingers are expanded by means of the rod 78, which operates by direct thrust instead of by turning.

Normally the valves 62' and 63' are closed, so that the air will pass through the ozonizer, and the valve 37' is normally open while the valve 38' is normally closed. The air will then pass through the ozonizer and through the pipe 37 to the front vertical distributers 40. By closing the valve 34' the ozonizer may be cut out. By closing the valve 37' and opening the valve 38' the direction of flow of the washing current through the containers or cells may be reversed. The air then passing through the rear vertical distributers. This reversing may be done as often as experience advises as necessary or as beneficial to secure the most wholesome results from the action of the sterilizing and ozonized air currents.

The valves 39' and 45' are normally closed and are opened only when it is desired to supply the inert gas from the tank 66, when the valve 57' is closed, while the exhaust pipes are left open so that the inflowing inert gas will displace the air in the cells, after which they are sealed and transported with the inert gas, which provides an inactive atmosphere for the organic materials or products. By charging the cells with the inert gas above atmospheric pressure contaminated air cannot enter the cells. The abnormal pressure of the inert gas causes it to penetrate the pores of the fruit or other organic product, and thus acts to arrest the production or evolution of carbon dioxid gas in the fruit or organic products being preserved.

By my improved process fruit or other organic products can be preserved without noticeable change in their aroma, tasting qualities, color or appearance.

In the present system of refrigeration the atmosphere surrounding the organic substances or products being preserved is saturated with moisture, which condenses in the low temperature in the interstices of the products, expanding in frost in the pores of the fruit or other organic substance, thus disrupting the organic fibers, cold "scalding" the surface portions of the fruit, while the aroma, taste, color and appearance is either weakened or destroyed. These results are avoided in my improved process. The charcoal packed with the organic product to be preserved acts to sweeten the fruit, while the ozone with which the washing air stream is charged, being a powerful and wholesome germicide, acts to destroy all germs present.

Having described my invention I claim:—

1. The preserving process consisting in subjecting the organic substance to be preserved to a washing current of aseptic air and alternating the direction of its flow and washing said air for reuse.

2. The preserving process consisting in subjecting the organic substance to be preserved to a washing current of aseptic, ozonized air and washing and reusing said air as stated.

3. The preserving process consisting in subjecting the organic substance to be preserved to alternated washing currents of aseptic ozonized air and washing and reusing said air as stated.

4. The preserving process consisting in subjecting the organic substance to be preserved to alternated washing currents of aseptic, cold ozonized air and washing and reusing said air as stated.

5. The preserving process consisting in subjecting the organic material to be preserved to alternated washing currents of dry, aseptic, cold ozonized air and cleansing and reusing said air as stated.

6. The preserving process consisting in subjecting the organic material to be preserved to a sterilizing washing current uniformly distributed through the material and cleansing and reusing said air as stated.

7. The preserving process consisting in subjecting the organic substance to be preserved to a washing current of cold sterilizing air flowed in direct contact with the organic substances, eliminating the organic products taken up by said flowed air from said air and reusing said air in a cold and sterilized state.

8. The preserving process consisting in subjecting the organic substance to be preserved to alternated washing currents of cold sterilizing air, washing, dehydrating and reusing said air in a cold and sterilized state.

9. The preserving process consisting in subjecting the material to be preserved to the washing influence of a dry, cold, aseptic, ozonized air and eliminating the gases generated in the material by absorbent means mixed therewith.

10. The preserving process consisting in placing the organic material to be preserved in a hermetically sealed container, subjecting the material to a cold aseptic current of air distributed internally through the material, absorbing the gases generated by the material, and cooling the container with an expanded gas.

11. The preserving process consisting in inclosing the organic material to be preserved in hermetically sealed containers, arranging these containers in a cooling cabinet, maintaining a continuous circulation of compressed air in diverging paths, one of said paths being through the cabinet and around the containers to cool the same and the other path being through the containers, the air passing through the cabinet being saturated with moisture and the air passing through the containers being charged with ozone.

12. The process of preserving consisting in inclosing the organic material to be preserved in closed containers, circulating a saturated cooling gas around said containers and circulating the same gas dehydrated, sterilized and ozonized through the containers and maintaining the gas in constant circulation by a common pressure medium.

13. The process of preserving consisting in inclosing the organic material to be preserved in closed containers, circulating a saturating compressed cooling gas around the containers and circulating the same gas dehydrated, sterilized and ozonized through the containers, returning the gas to a common path and maintaining the gas in motion by a common pressure medium.

14. The process of preserving consisting in inclosing the organic material to be preserved in closed containers, subjecting the contents thereof to a sterilizing action when inclosed, absorbing the gases generated by the contents by means mixed therewith, and surrounding the contents after such treatment with an inert gas.

15. The process of preserving consisting in inclosing the organic material to be preserved in closed containers arranged in spaced relation to each other to provide air spaces therebetween, circulating compressed air through said air spaces, circulating compressed air through the containers in direct contact with the organic material in the containers, ozonizing said air before its passage through the containers, and reversing the flow of the ozonized compressed air through the containers to equalize the influence of the ozone charge upon the contents of said containers.

16. The process of preserving consisting in inclosing the organic material to be preserved in closed containers spaced from each other to provide air spaces, circulating compressed air through said air spaces passing said compressed air through a washing after leaving the air spaces, dehydrating, sterilizing and ozonizing a portion of said air after being washed and passing said portion through the containers.

17. The preserving process consisting in circulating a cooling gas through the organic products to be preserved and in direct contact with said products.

18. The preserving process consisting in circulating a cooling gas in alternated directions through the organic products to be preserved and in direct contact with said products.

19. The preserving process consisting in circulating a compressed gas through the organic products to be preserved and in expanding said gas in direct contact with the products.

20. An aseptic preserving process consisting of packing the organic substance to be treated in an air tight vessel adapted to serve as a commercial package in commercial transportation, ventilating the package internally to eliminate undesirable gases, and subjecting the substance while in the package to the washing action of an aseptic, dehydrated, cool ozonized air current directed through said substance under pressure and expanded in direct contact with said substance, and externally cooling said package during storage and transportation.

21. An aseptic preserving process consisting of packing the organic substance to be preserved in an air tight container adapted to be externally sealed, eliminating the gases generated by said substance while in the container, subjecting said substance while in the container to the washing action of an aseptic, dehydrated, cool ozonized air directed through the container in intimate contact with said substances and expanded in intimate contact therewith, reversing the flow of said air current at intervals of time, displacing said ozonized air by an inert gas under pressure exceeding one atmosphere, and maintaining said container with its contents in a keeping temperature during storage or commercial transportation.

22. The preserving process which consists of inclosing the material to be preserved in an air tight container, washing said material with an ozonized, cooled air current, and displacing said air with nitrogen.

23. The preserving process consisting in inclosing organic substances to be preserved in hermetically sealed containers, circulating a compressed, aseptic, cold gas through said containers and in direct contact with the material contained therein, whereby said gas will take up the heat of the organic materials and carry off the products of organic change, passing said gas after its passage through the containers through a cleansing process to eliminate the organic substances taken up thereby, and returning said cleansed gas to the containers for reuse.

24. The process of preserving consisting in inclosing the organic substances in hermetically sealed containers, maintaining a constant continuous circulation of a cold and aseptic gas through said containers and flowing said gas in direct contact with the organic substances, and cleansing said gas after leaving said containers and before its return thereto.

25. The process of preserving consisting in inclosing the organic products to be preserved in a closed container, maintaining a continuous circulation of a compressed cold gas through said container and flowing said gas in its passage through the container so as to contact with said products and take up the products of organic change produced thereby, and cleansing, dehydrating, sterilizing and cooling said gas after its passage through said container and before its return to the container.

26. The process of preserving consisting in inclosing the organic products to be preserved in a hermetically sealed container, introducing a cold, aseptic, ozonized gas into said container so that the gas will contact with the organic products, exhausting said gas from said container, cleansing, dehydrating, ozonizing and cooling said gas exhausted from said container, and returning said cleansed, dehydrated, ozonized and cooled gas to the container.

In testimony whereof I affix my signature in presence of two witnesses.

NEWTON J. DARDEN.

Witnesses:
 WALLACE J. HILL,
 RAE SIEGEL.